United States Patent Office 2,871,097
Patented Jan. 27, 1959

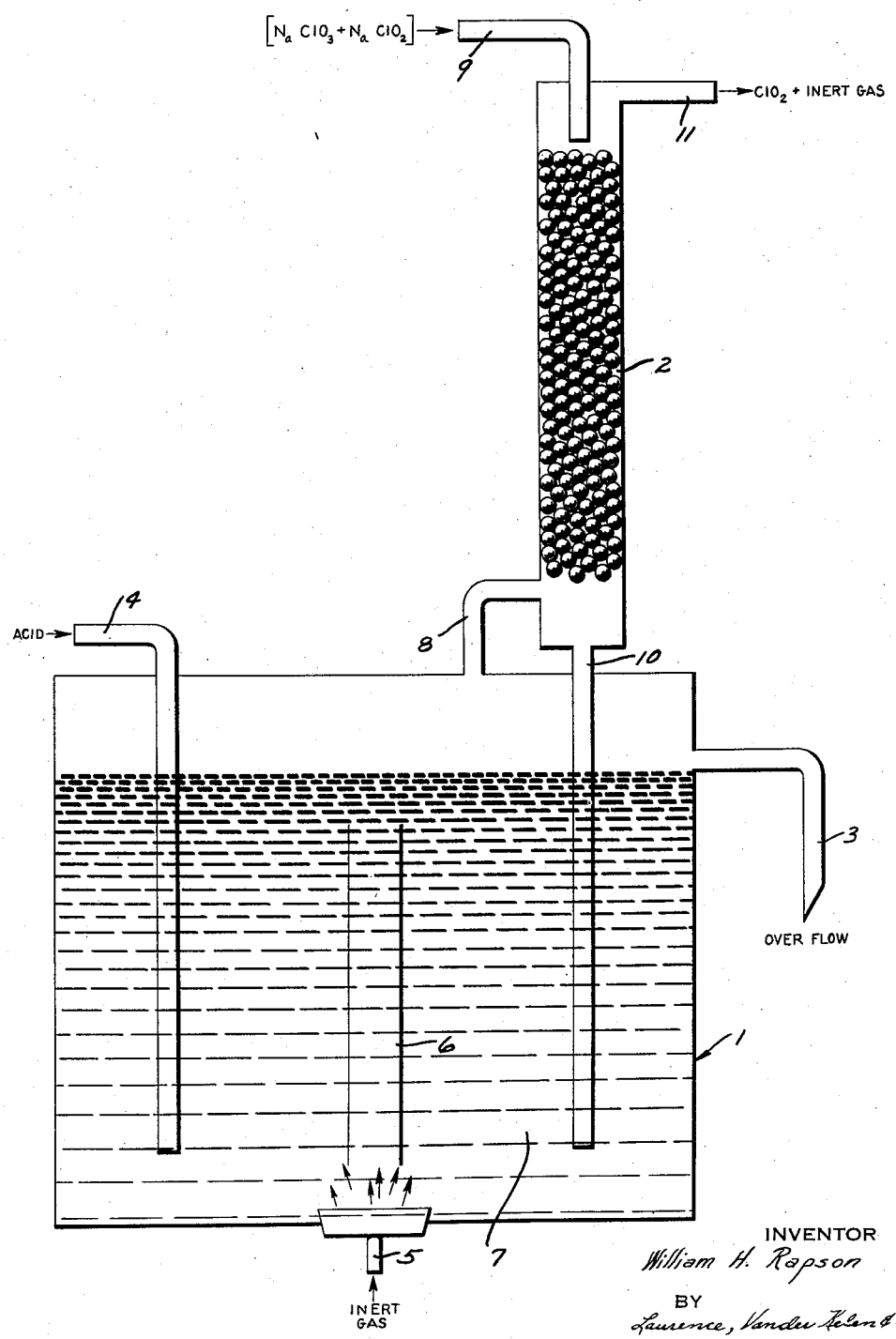

2,871,097
PRODUCTION OF CHLORINE DIOXIDE

William Howard Rapson, Toronto, Ontario, Canada, assignor to Hooker Chemical Corporation, Niagara Falls, N. Y., a corporation of New York Application February 6, 1956, Serial No. 563,739

4 Claims. (Cl. 23—152)

This invention relates to a process for the preparation of chlorine dioxide and is more particularly concerned with such a process whereby the resulting chlorine dioxide is substantially free of chlorine.

Chlorine dioxide has achieved considerable commercial significance in the bleaching of pulp, textiles, flour, fat, et cetera, water purification, et cetera. Generally, where large amounts of chlorine dioxide are desired, sodium chlorate has been the source material. This sodium chlorate is contacted with a reducing agent such as sulfur dioxide, oxalic acid, hydrochloric acid, organic reducing agents, etc., under very carefully controlled conditions, to produce chlorine dioxide containing more or less chlorine depending on the particular conditions employed. Because of the inherent explosiveness of chlorine dioxide, extensive controls on the reaction conditions and reaction effluent are required, and, because of the economic factors and difficulty of start-up and shutdown, the process is desirably run continuously. Further, where pure chlorine dioxide is required, separation of the chlorine from the chlorine dioxide must be accomplished.

Where an intermittent process or smaller quantities are to be employed, commercial installations have generally relied on sodium chlorite as source material. This sodium chlorite is carefully reacted with chlorine to generate pure chlorine dioxide. Here again, rather extensive safety precautions are necessary. Sodium chlorite is an expensive source of chlorine dioxide, since it is manufactured from chlorine dioxide in the first place, with a loss of one fifth of the oxidizing power of the latter, and with considerable inefficiency.

It is a principal object of the present invention to provide a process for the manufacture of chlorine dioxide which is easy to operate and which involves relatively simple equipment. A further object of the present invention is the provision of a process which allows the preparation of chlorine dioxide substantially uncontaminated by chlorine. Another object of the present invention is the provision of a process which uses a mixture of chlorate and chlorite to prepare chlorine dioxide. Other objects will become apparent hereinafter.

In the method of the present invention, an approximately 1:1 mole mixture of aqueous chlorate and chlorite is passed continuously in intimate contact with a gas containing a mole ratio of chlorine dioxide to chlorine of approximately 2:1. Thereafter, the solution of chlorate and chloride which results is contacted continuously with acid to prepare a mixture of chlorine and chlorine dioxide, which in turn is contacted with additional chlorate and chlorite. The reactions may be summarily represented as follows:

(a) $[NaClO_3 + NaClO_2] + ClO_2/Cl_2 \rightarrow$
$[NaClO_3 + NaCl] + 2ClO_2$ (b) $[NaClO_3 + NaCl] + H_2SO_4 \rightarrow ClO_2/Cl_2$ As disclosed in a copending application, Serial No. 493,050, efficient production of a mixture of chlorine dioxide and chlorine, in a ratio of approximately one mole of chlorine dioxide to one-half mole of chlorine $(ClO_2/Cl_2)$ may be accomplished by the reaction of a dilute mixture of a chlorate and a chloride with a concentrated solution of an acid, according to the following summary reaction:

(c) $2ClO_3^- + 2Cl^- + 4H^+ \rightarrow 2ClO_2 + Cl_2 + 2H_2O$

For convenience in understanding the process of the present invention, reference is made to the drawing which illustrates a typical apparatus employed. A reactor tank 1 is provided equipped with a bubble plate or packed tower 2, an overflow pipe 3, an acid inlet 4, an inert gas diffuser 5 and a tube 6 to promote rapid gas flow. A reaction mixture 7 is within reactor tank 1, and gas generated by the reaction mixture passes to tower 2 through conduit 8. An aqueous salt mixture of chlorate and chlorite is introduced continuously into tower 2 through conduit 9. Tower 2 is connected with reactor tank 1, in addition to conduit 8 by conduit 10 having an orifice below the surface level of reaction mixture 7. Gaseous products of the reaction are taken off the top of tower 2 by conduit 11.

When the reaction has reached a steady state, a substantially equimolecular mixture of chlorate and chlorite is introduced at conduit 9. Concentrated acid is introduced at conduit 4 and an inert gas in an amount sufficient to maintain the effluent gases non-explosive is introduced through gas diffuser 5. Preferably, this gas is introduced in a manner which will cause agitation of reaction mixture 7. Reaction mixture 7 will contain some chlorate and chloride ions which react with the concentrated acid to prepare a mixture of chlorine and chlorine dioxide. The chlorine and chlorine dioxide leave reaction mixture 7 and pass into tower 2 through conduit 8. Within tower 2 the chlorine reacts with the chlorite to form chlorine dioxide and chloride, the chlorine dioxide exiting through conduit 11. The chlorate and chloride mixture which results passes through conduit 10 into contact with the concentrated acid to form additional chlorine dioxide and chlorine. The liquid level of reaction 7 is maintained by overflow conduit 3, and effluent from conduit 3 may be purified, discarded or recycled. It will thus be seen that a process for the generation of substantially pure chlorine dioxide has been provided. The acid concentration of the liquid reaction mixture should be at least 3.5 molar, preferably in the case of phosphoric acid, at least 7 molar. In the case of sulfuric acid, the acid concentration of the reaction mixture desirably should not exceed 7 molar and in the case of phosphoric acid desirably should not exceed 15 molar. The concentration of the chloride and chlorate ions in reaction mixture 7 should preferably be maintained between 0.3 to 0.001 molar.

The reaction between chlorine and sodium chlorite to produce chlorine dioxide when occurring in a solution of both chlorate and chlorite is very rapid and very efficient. Neither the chlorate nor the chlorine dioxide is affected, as the chlorine dioxide prepared in the concentrated acid passes unchanged through the tower, and that prepared in the tower merely is swept out. The reaction between the concentrated acid and the chlorate and chloride is also very rapid and highly efficient. Overall then, these combined reactions yield, with a minimum of equipment and controls, substantially pure chlorine dioxide in an amount of one mole per mole of chlorate and one mole per mole of chlorite, indicating that substantially all of the oxidizing power in both the chlorate and chlorite is obtained without loss in side reactions. A distinct advantage of this overall process is that none of the reactions involved produce or consume much heat. Therefore, the combined process may be carried out without the necessity of any type of heat exchanger, which simplifies the equipment required and diminishes operating difficulties and maintenance problems.

The following examples are given to illustrate the process of the present invention, but are not to be construed as limiting.

*Example 1*

The apparatus used is illustrated in the accompanying drawing. A solution containing 3.17 moles per liter of sodium chlorate and 3.27 moles per liter of sodium chlorite was introduced continuously at the rate of 2.4 milliliters per minute into the top of a bubble-plate tower. Simultaneously a solution of sulfuric acid containing 15 moles of $H_2SO_4$ per liter was introduced at the rate of 1.5 milliliters per minute into a reaction mixture, consisting essentially of sulfuric acid. Air was introduced continuously in fine bubbles through a sintered gas diffuser at a rate of approximately 3.1 liters per minute. Liquor overflowed from the reaction mixture at approximately the combined rate of flow of the ingoing liquids, while the whole liquid was in continuous agitation caused by the air flowing through the reaction mixture. The temperature of the reaction mixture was thirty degrees centigrade. Air was continuously drawn by suction through the top of the tower removing both chlorine and chlorine dioxide from the reaction mixture and causing it to pass through the tower. The gas removed from the top of the tower contained 99.5 moles of chlorine dioxide to 0.5 mole of chlorine, which represents an efficiency of conversion from reacted chlorate and chlorite to chlorine dioxide of 98.8 percent. The effluent solution was analyzed and found to contain 0.12 mole of chlorate, no chlorite and 0.04 mole of chloride per liter of effluent and to be 4.77 molar in sulfuric acid. Therefore, 94.8 percent of the ingoing chlorate reacted with 98.8 percent efficiency, giving an overall yield of 93.5 percent of the theoretically possible chlorine dioxide.

*Example 2*

In a manner similar to that of Example 1, a solution containing 3.35 moles per liter of sodium chlorate and 3.33 moles per liter of sodium chlorite was introduced into the tower at the rate of 2 milliliters per minute. A solution of sulfuric acid containing 15.15 moles per liter was introduced at the rate of about 1.82 milliliters per minute into the reaction mixture. Air was introduced at a rate of approximately 3.1 liters per minute. The temperature of the reaction mixture was thirty degrees centigrade. The gas leaving the column contained 99.1 moles of chlorine dioxide to 0.9 mole of chlorine, which represents an efficiency of conversion from reacted chlorate and chlorite to chlorine dioxide of 99.1 percent. The effluent solution was analyzed and found to contain 0.0481 mole chlorate and 0.0178 mole chloride per liter, and to be 6.24 molar in sulfuric acid. Therefore 98 percent of the ingoing chlorate reacted with 99.1 percent efficiency, giving an over-all yield of 97.1 percent of the theoretically possible chlorine dioxide.

The solution of chlorate and chlorite introduced at the top of the tower should contain approximately equimolecular quantities of chlorate and chlorite in order that maximum efficiency might be obtained. Its concentration is not critical; however, very dilute solutions cause undue dilution of the acid in the reaction mixture, while very concentrated solutions are difficult to handle. Maximum efficiency is obtained with a solution containing at least 2.5 moles per liter of chlorate, although more dilute solutions are operative.

An equimolecular mixture of chlorate and chlorite may be readily prepared by contacting sodium hydroxide with chlorine dioxide. If other processes employing oxidizing or reducing agents cause the production of more chlorite than desired, addition of chlorate will allow the preparation of an equimolecular mixture. While the invention has been particularly described using sodium salts, it is to be understood that other soluble salts of chlorates and chlorites may be employed.

As disclosed in Serial 493,050, filed March 8, 1955, a relatively dilute solution of a chlorate and a chloride are reacted with a relatively concentrated solution of a strong acid to prepare a mixture of chlorine dioxide and chlorine. Strong acids which are suitable include, for example, sulphuric, phosphoric, perchloric, etc. The chlorate and chloride ion concentrations should be maintained below about 0.5 molar in the reaction mixture. Air or other inert gases may be used to sweep the reaction mixture and tower, thereby preventing explosive build-ups of chlorine dioxide.

The overall process provided herein requires no controls other than those to meter the solutions into the generator, requires no heat exchangers and has many economic advantages. Start-up and stopping are readily accomplished by starting or stopping the flow of solutions. It is advisable that the inert gas be used to sweep the generator for a period after stopping the flow of solutions to sweep out chlorine dioxide produced by residual reactants. About twice as much chlorine dioxide is obtained as can be prepared from chlorite by other means.

Various modifications can be made in the method of the present invention without departing from the spirit or scope thereof and it is to be understood that I limit myself only as defined in the appended claims.

I claim:

1. In a process for producing chlorine dioxide the steps of: contacting a solution containing substantially equimolecular quantities of a metal chlorate and metal chlorite with a gas containing chlorine and chlorine dioxide in approximately 2 to 1 molar ratio thereby to produce a mixture of higher content of chlorine dioxide, a chlorate and a chloride; separating the chlorine dioxide thus produced; introducing the resulting chlorate and chloride containing solution thus produced into a reaction mixture comprising a concentration of between about 0.3 and 0.001 molar each of a chlorate and a chloride in an aqueous solution of a strong acid selected from the group consisting of sulfuric acid 3.5–7 molar in acid and phosphoric acid 7–15 molar in acid, to produce an additional chlorine dioxide and chlorine gas mixture; and, further contacting said gas mixture with additional chlorate and chlorite.

2. A process for the production of chlorine dioxide which comprises; continuously contacting countercurrently an aqueous solution containing substantially equimolecular quantities of a metal chlorate and metal chlorite with a gas containing chlorine dioxide and chlorine in an approximately 2 to 1 molar ratio, thereby to produce additional chlorine dioxide gas substantially free of chlorine and a solution containing a chlorate and a chloride; separating the chlorine dioxide thus produced; continuously introducing the solution resulting from said contacting into a reaction mixture comprising a concentration of between about 0.3 and 0.001 molar each of a chlorate and a chloride in an aqueous solution of a strong acid selected from the group consisting of sulfuric acid 3.5–7 molar in acid and phosphoric acid 7–15 molar in acid; continuously adding additional acid selected from the group consisting of sulfuric acid having a concentration ranging from more than 7 molar in acid to concentrated sulfuric acid and phosphoric acid having a concentration ranging from more than 15 molar in acid to concentrated phosphoric acid to said reaction mixture, thereby to produce an additional chlorine dioxide and chlorine gas mixture; and further continuously contacting countercurrently said gas mixture with additional solution containing substantially equimolecular quantities of metal chlorate and metal chlorite.

3. A process for the production of chlorine dioxide substantially free from chlorine which comprises: continuously adding an aqueous solution containing a metal chlorate and a metal chlorite in substantially equimolar ratio to the first of two reactors, in which said solution comes into countercurrent contact with a gas containing chlorine dioxide and chlorine in an approximately 2 to 1 molar ratio, said gas having been produced in the second reactor, thereby to produce in said first reactor additional chlorine dioxide gas substantially free of chlorine and a solution containing a chlorate and a chloride; continuously separating the chlorine dioxide thus produced; continuously introducing the chlorate and chloride-containing solution produced in said first reactor into the second reactor which contains a reaction mixture comprising a concentration of between about 0.3 and 0.001 molar each of a chlorate and a chloride in an aqueous solution of a strong acid selected from the group consisting of sulfuric acid 3.5–7 molar in acid and phosphoric acid 7–15 molar in acid; continuously adding to said second reactor a strong acid selected from the group consisting of concentrated sulfuric and concentrated phosphoric; continuously removing the excess solution from the second reactor; continuously passing the gas containing chlorine dioxide and chlorine which is produced in the second reactor into the first reactor.

4. The process for the production of chlorine dioxide substantially free from chlorine according to claim 3, wherein the metal chlorate and metal chlorite are sodium chlorate and sodium chlorite, respectively.

References Cited in the file of this patent

UNITED STATES PATENTS

| | | |
|---|---|---|
| 2,043,284 | Cunningham | June 9, 1936 |
| 2,317,443 | Cunningham | Apr. 27, 1943 |
| 2,489,572 | Hampel et al. | Nov. 29, 1949 |
| 2,654,656 | Evans | Oct. 6, 1955 |

FOREIGN PATENTS

| | | |
|---|---|---|
| 595,528 | Great Britain | Dec. 8, 1947 |
| 687,099 | Great Britain | Feb. 4, 1953 |